Nov. 3, 1964   J. MEYERS   3,155,938

TIRE DEFLATION DEVICE AND SYSTEM

Filed Dec. 7, 1959   2 Sheets-Sheet 1

INVENTOR:
Joseph Meyers
BY
Mellin and Hanscom
ATTORNEYS

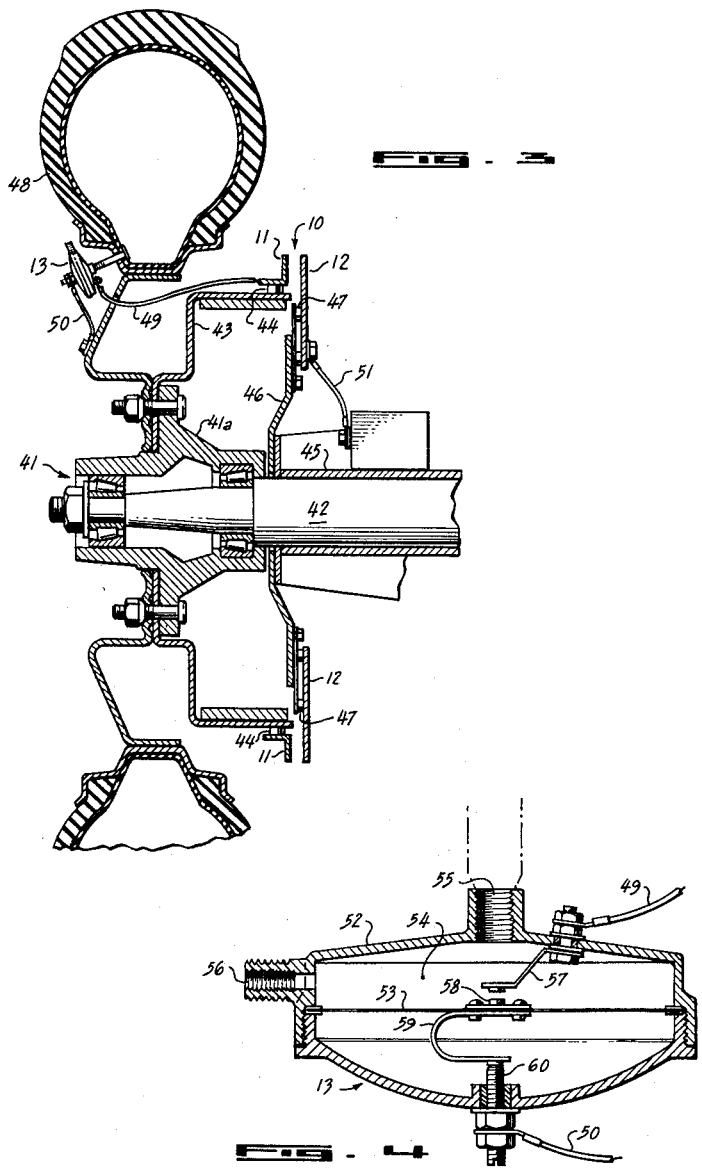

United States Patent Office 3,155,938
Patented Nov. 3, 1964

3,155,938
TIRE DEFLATION DEVICE AND SYSTEM
Joseph Meyers, 23 Alter St., Cloverdale, Calif., assignor of twenty-five percent to McCulloch Investments, a copartnership, twenty-five percent to Chesley L. Wolfe and Luree C. Wolfe, ten percent to Richard L. Cooper, and forty percent to said Joseph Meyers, all of Cloverdale, Calif.
Filed Dec. 7, 1959, Ser. No. 857,839
9 Claims. (Cl. 340—58)

This invention relates to detection devices and more particularly involves apparatus for detecting an existing condition in a moving part.

It is common knowledge that the operation of a vehicle with tires at sub-normal tire pressures causes higher tire operating temperatures and produces strains and stresses, which results in premature wear and fatigue, while generally impairing the vehicle's maneuverability. Therefore, it is not surprising to learn that low tire pressures are a prime cause of moving accidents and that high speed vehicles, including aircraft, present a constant danger to lives and property due to a loss of control through an undetected tire pressure failure.

As indicated, this invention may be advantageously employed for detecting a sub-normal tire pressure in the tire of a vehicle, and of airborne vehicles in particular. It will be readily understood that since airplanes use their wheels only at a time of taking off or landing, air leaks which may develop in a tire generally remain unnoticed except during those infrequent periods of usage. And where an air leak occurs during flight, producing a soft tire, the hazards in making a safe landing are greatly increased, for the pilot would be unaware of the condition. On the other hand, if the pilot is forewarned of the dangerous condition it is possible for him to make compensating maneuvers and to bring his plane in for a safe landing.

Hence, one object of this invention is to provide a safety device that will detect a low tire pressure in a moving vehicle, such as a plane or a truck, and to provide an audible or visual warning of the unsafe condition to the driver. While detection devices have been previously devised for this purpose, this invention provides a novel apparatus having the desirable and essential attributes of reliability, economy and safety. Contra-distinguished therewith many of the prior art detecting devices have very serious shortcomings; where transmitters are employed there is a problem of "jamming" or interference from other signals; some detection devices, because of their weight, produce an extreme wheel unbalance; and others are difficult to install upon ordinary vehicle tires.

It is a second object of this invention to provide a pressure sensitive safety device upon a rotatable member for detecting a sub-normal pressure condition and initiating a signal across a capacitive coupling to a relatively fixed member, whereby said signal is transmitted to an indicator device for alarming the attendant.

A third object is to provide a detection system for use with a number of pneumatic systems and having an alarm system capable of indicating which, if any, of the pneumatic systems is sub-normally pressurized.

Another object of this invention is to provide apparatus for detecting a condition upon a moving part and indicating that fact at a relatively fixed station, comprising: a capacitor having first and second plates, said first plate being mounted to a rotatable moving part and said second plate being mounted to a relatively fixed part, said plates being supported at substantially fixed distances apart; switch means mounted upon said moving part and responsive to a condition theron for grounding said first plate; and means including said second plate for sensing the grounding of said first plate and producing a signal in response thereto.

A further object is to provide apparatus for detecting a condition upon a moving part and indicating that fact at a relatively fixed station, comprising: a capacitor having first and second plates, said first plate being mounted to a moving part and said second plate being mounted to a relatively fixed part, said plates being supported at substantially fixed distances apart; switch means mounted upon said moving part and responsive to a condition thereon for grounding said first plate; means for sensing the grounding of said first plate and producing a signal in response thereto, said means comprising a transistor oscillator, a bridge circuit energized by said oscillator and including said second plate, and a transistor amplifier, said means being packaged as a compact unit and mounted in close proximity to said first plate; and means responsive to said signal for indicating the existence of said condition.

Other objects and advantages of this invention will become apparent in view of the drawings and the following description.

In the drawings forming a part of this application, and in which like parts are identified by like reference numerals throughout the same, FIG. 1 is a symbolic diagram showing the electrical connection for apparatus comprising this invention.

FIG. 3 is a vertical section taken through the pneumatic tire and axle of a vehicle and showing a detailed physical arrangement of a portion of the apparatus included in the novel detector system.

FIG. 4 is a tranverse section of a pressure sensitive switch that may be used for detecting a sub-normal tire pressure.

Figure 1:
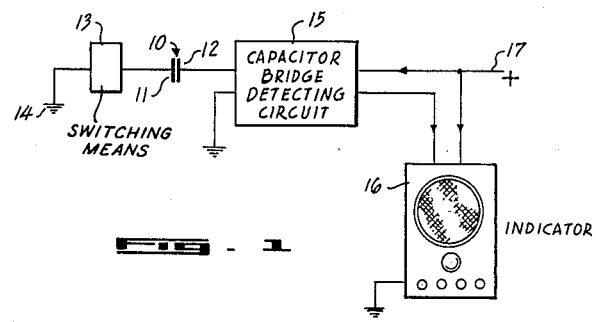

Referring more particularly to FIG. 1, this invention includes a condenser 10 having a first plate 11 adapted for being mounted upon a rotatable member, such as a wheel, and a second plate 12 adapted for being mounted to a relatively fixed member, such as the frame of a vehicle. In addition, and in general terms of description, a switch means 13 is provided for connecting plate 11 to ground 14, said switch means being sensitive to a condition upon a rotatable member. Plate 12 is connected to a bridge detecting circuit 15 that produces a signal upon the unbalance thereof and transmits said signal to an indicator device 16. Plates 11 and 12 are mounted in close proximity to each other so that upon actuation of switch 13, connecting plate 11 to ground 14, the condenser 10 forms part of an oscillating circuit in bridge detector 15, causing an unbalance thereof and producing a signal which is applied to warning indicator 16.

Figure 2:
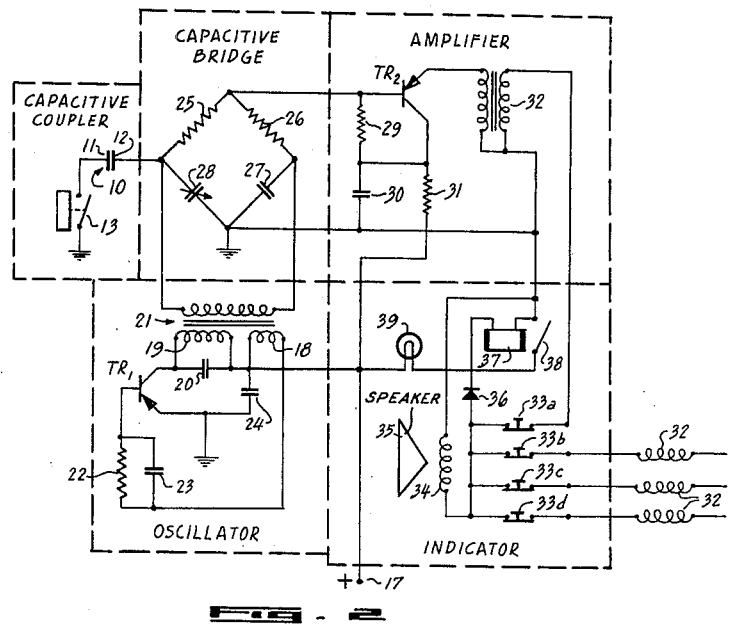
FIG. 2 is an electrical schematic diagram of a preferred capacitive detector circuit with a signal indicator.

There is shown in FIG. 2 a detecting circuit diagram for coupling an alarm signal from the switch means, located on a rotatable component, to an indicator device containing an audible and visual alarm indicator. The circuit illustrated is comprised of five major divisions including a capacitive coupler means, an audio-frequency oscillator circuit, a capacitive bridge circuit, an audio-frequency amplifier and an indicator. The capacitive coupler comprises plate 11 of a condenser 10 and a condition sensitive switch 13, both of which may be mounted upon a rotatable element. The bridge circuit, oscillator and amplifier are preferably packaged together, and in order to minimize the effect of distributed and stray capacity to the input circuit of the bridge, the unit is located physically within a few inches of the capacitor plate 11. This will allow the maximum percentage of capacity change in plate 12 to be used as a signal to the bridge. As shown, a battery supply 17 is connected to each device as a power source.

The basic transistorized oscillator circuit shown is known as a tickler feedback oscillator since the feedback coil 18 serves to tickle or feedback energy of the proper phase to sustain oscillation. The collector of $TR_1$, a PNP junction transistor, is coupled to the load impedance 19 and capacitor 20 which has a magnitude of several thousand ohms. This common-emitter configuration is used with a transformer 21 including the feedback coil 18 which provides a 180 degree phase shifted signal. The turns ratio of coils 18 and 19 is selected to match the transistor base and collector parameters so that stable and reliable output is assured under adverse environmental and battery voltage variations. Additional components may be employed as compensation means when unusual conditions are encountered. And such components or modifications as temperature compensating capacitors and circuit configurations designed to swamp or divide undesirable effects are techniques well known in the art. Coil 19 and capacitor 20 establish the collector load circuit and influence the operating frequency of the oscillator. Base bias current is supplied through resistor 22, by-passed by capacitor 23. A capacitor 24 is used to by-pass and isolate currents from all of other circuits.

The bridge circuit comprises resistances 25 and 26, digital capacitor 27 and variable capacitor 28. The circuit is adjusted for a null condition with switch 13 open by operating the variable capacitor 28. When the signal switch is closed the increased capacity provided by capacitor 10 results in an unbalanced bridge so that the audio oscillator power is connected to the input of the audio frequency amplifier, which is commonly referred to as an emitter follower or common collector circuit. The output signal from the bridge appears across the base bias resistor 29 of the transistor amplifier. Capacitor 30 is an audio by-pass for the base bias supply and also serves as a decoupling network in combination with resistance 31. Transistor $TR_2$ like $TR_1$ is a PNP junction type unit, many standard types now being available such as the 2N44 and the 2N414. The transformer 32 is a step-down audio output transformer with the primary in the emitter circuit of $TR_2$.

The indicator unit functions as an alarm device for an operator, and a light and an audible tone is used to display the alarm signal. The audio alarm signal is the signal coupled from one or more transformers 32, each having its own bridge circuit. The exact number of bridge circuits and transformers will, of course, depend upon the number of sensors required in the particular system. The outputs from the audio transformers are connected in parallel through respective normally closed switches 33a, 33b, 33c (etc.) to the voice coil 34 of a small speaker 35 and the rectifier relay combination 36 and 37 for operation of switch 38, causing lamp 39 to be lit. Additional contacts may be added to relay 37 so that special functions may be performed, like recording.

A digital capacity variation results in any one bridge circuit when switch 13 of that circuit is actuated closed. The increased capacity on one side of an audio frequency bridge produces a substantial increase in the audio output voltage of its respective transformer, causing an audible noise in speaker 35 and resulting in an operation of relay 37 which lights lamp 39. Since the alarm signal thus given may be caused by any one of the bridge circuits, the operator will then proceed to operate switches 33a, 33b, etc. until the signal ceases. It will be apparent from the circuit diagram that a break in the parallel line (or lines) which is supplying a signal voltage will immediately deactivate voice coil 34 and relay 37. Accordingly, when the signal ceases upon actuation of a particular switch (or combination of switches 33), this indicates which of the detecting circuits and their associated devices are in fault.

FIG. 3 illustrates a preferred arrangement for mounting a pressure sensitive switch 13 and capacitor plates 11 and 12 upon the wheel and axle housing of a vehicle. As shown, a wheel 41 is mounted upon axle 42 in a conventional manner. The hub portion 41a of the wheel is, however, provided with a brake housing 43 and this housing supports a ring-like capacitor plate 11 upon stand-off insulators 44. A corresponding ring-like capacitor plate 12 is mounted to the axle housing 45 by a radially extending support plate 46 having stand-off insulators 47. The ring-like capacitor plates 11 and 12 are thus supported a relatively fixed distance apart for all positions of wheel rotation. The exact distance will be determined by design considerations of the selected capacitance, where distance between plates is approximately inversely proportional to the desired capacitance.

A pressure sensitive switch 13, one form of switch being more particularly shown in FIG. 4, is mounted to the valve stem of a tire 48. Upon closure of switch 13 a conductive connection is made from plate 11 through insulated wires 49 and 50 to the wheel hub 41a or ground. Plate 11 is connected to the capacitor bridge circuit (which is mounted in close proximity thereto for the reason previously explained) by an insulated wire lead 51.

The pressure sensitive switch of FIG. 4 comprises a relatively small hollow shell 52 that is internally divided by a resilient diaphragm 53 forming a pressure chamber 54 having a threaded opening 55 and a valved opening 56. Opening 56 is fitted with a conventional check valve device (not shown) which is commonly used on pneumatic tires. Within chamber 54 is disposed a terminal contact member 57, said member being mounted to shell 52 but electrically insulated therefrom. A second contact member 58 is mounted upon diaphragm 53 proximate said first contact and is actuable into engagement therewith. Contact 58 has a spring arm 59 which engages an adjustable terminal 60 mounted to shell 52. The spring action of arm 59 resists the movement of diaphragm 53 and biases contact 58 into engagement with contact 57. Terminal 60, like terminal contact 57, is electrically insulated from shell 52 and both terminals have insulated wire leads which are connected respectively to capacitor plate 11 and ground.

The pressure sensitive device described may be connected to any ordinary tire by attaching the opening 55 to the threaded valve stem of said tire. But before connecting the pressure switch of FIG. 4, the valve device normally contained in a tire's valve stem is removed, thus allowing a free passage of air through the valve stem and an application of air pressure onto diaphragm 53. The air pressure will then be sustained in the tire and chamber 54 by the check valve device which obstructs opening 56 but permits the tire to be inflated in the customary manner.

It should be apparent that as the pressure within chamber 54 of the illustrated pressure sensitive switch is increased, the diaphragm is pushed against the resilient bias of spring arm 59. Provided that a proper adjustment of terminal 60 has been made, contacts 57 and 58 will separate at the point where the pressure in chamber 54 exceeds a predetermined minimum unsafe condition. Conversely, having previously inflated a tire to its proper air pressure, contacts 57 and 58 will be separated. But as the pressure is reduced the diaphragm and contact 58 will be moved toward contact 57, and at the predetermined unsafe pressure condition the contacts will engage. In combination with the circuitry previously described, the making of contact will cause plate 11 of FIGS. 1-3 to be made a component part of the oscillating bridge circuitry, thereby upsetting the balance of the previously nulled bridge and producing an electrical signal voltage. The signal voltage will then be detected by the indicator means in the manner described, and the precise location of tire pressure failure may be determined.

While the form of the invention herewith shown and described is a preferred embodiment of the same, it is to be understood that various changes may be resorted to without departing from the spirit of the invention or the scope of the attached claims, and each of those changes is contemplated.

Having thus described my invention what I claim and desire to secure by Letters Patent is:

1. Apparatus for detecting a condition upon a moving part and indicating that fact at a relatively fixed station, comprising: a capacitor having first and second plates, said first plate being mounted to a freely rotatable moving part and said second plate being mounted to a relatively fixed part, said plates being supported at substantially fixed distances apart; whereby said first plate is movable relative to the second plate by movement of said moving part without producing a substantial change in the capacitance of said capacitor; switch means mounted upon said moving part and responsive to a condition thereon for grounding said first plate; and means including said second plate responsive to grounding of said first plate for producing a signal.

2. Apparatus for detecting a condition upon a moving part and indicating that fact at a relatively fixed station, comprising: a capacitor having first and second plates, said first plate being mounted to a freely rotatable moving part and said second plate being mounted to a relatively fixed part, said plates being supported at substantially fixed distances apart; whereby said first plate is movable relative to the second plate by movement of said moving part without producing a substantial change in the capacitance of said capacitor; switch means mounted upon said moving part and responsive to a condition thereon for grounding said first plate; a bridge circuit including said second plate responsive to grounding of said first plate for producing a signal; and means responsive to said signal for indicating the existence of said condition.

3. Apparatus for detecting a condition upon a moving part and indicating that fact at a relatively fixed station, comprising: a capacitor having first and second plates, said first plate being mounted to a rotatably moving part and said second plate being mounted to a relatively fixed part, said plates being supported at substantially fixed distances apart; whereby said first plate is movable relative to the second plate by movement of said moving part without producing a substantial change in the capacitance of said capacitor; switch means mounted upon said moving part and responsive to a condition thereon for grounding said first plate; means responsive to grounding of said first plate for producing a signal, said means comprising a transistor oscillator, a bridge circuit energized by said oscillator and including said second plate, and a transistor amplifier connected to the output of said bridge circuit, said means being packaged as a compact unit and mounted in close proximity to said first plate, and means responsive to said signal for indicating the existence of said condition.

4. Apparatus for detecting a low pressure condition in one of the pneumatic tires on a vehicle, comprising: a capacitor having first and second plates, said first plate being mounted upon a rotatable wheel of said vehicle and said second plate being mounted to a relatively fixed part of said vehicle, said plates being supported at substantially fixed distances apart; whereby said first plate is movable relative to the second plate by movement of said rotatable wheel without producing a substantial change in the capacitance of said capacitor; a tire pressure sensitive switch connected to the tire of said wheel and responsive to the pressure condition of said tire for grounding said first plate; and means including said second plate responsive to grounding of said first plate for producing a signal.

5. Apparatus for detecting a low pressure condition in one of the pneumatic tires on a vehicle, comprising a capacitor having first and second plates, said first plate being mounted upon a rotatable wheel of said vehicle and said second plate being mounted to a relatively fixed part of said vehicle, said plates being supported at substantially fixed distances apart; whereby said first plate is movable relative to the second plate by movement of said rotatable wheel without producing a substantial change in the capacitance of said capacitor; a tire pressure sensitive switch connected to the tire of said wheel and responsive to the pressure condition of said tire for grounding said first plate; and means responsive to grounding of said first plate for producing a signal, said means comprising a transistor oscillator, a bridge circuit energized by said oscillator and including said second plate, and a transistor amplifier connected to the output of said bridge circuit, said means being packaged as a compact unit and mounted in close proximity to said first plate.

6. Apparatus for detecting a low pressure condition in one of the pneumatic tires on a wheeled vehicle, comprising: a plurality of capacitors having first and second plates, each of said first plates being mounted upon one of the rotatable wheels of said vehicle, each of said second plates being mounted to a relatively fixed part of said vehicle and supported at a substantially fixed distance from its respective first plate; whereby each first plate is movable relative to its respective second plate by movement of the rotatable wheel to which the first plate is mounted without producing a substantial change in the capacitance of said capacitor; a tire pressure sensitive switch connected to the tire of each rotatable wheel and responsive to the pressure condition of said tire for grounding the first plate on said wheel; means including each of said second plates responsive to grounding of said first plates for producing a signal; and switch means for ascertaining which of said first plates is grounded.

7. Apparatus for detecting a condition upon a moving part and indicating that condition at a relatively fixed station, comprising: a capacitor having first and second plates, one of said plates being mounted to a moving part and movable relative to the other plate without producing a substantial change in the capacitance of said capacitor; switch means responsive to a condition for grounding one plate, and means including the other plate responsive to grounding of said one plate for producing a signal.

8. The apparatus of claim 7 wherein said first and second plates are rings mounted coaxially in spaced relationships upon an axis of rotation for said moving part, said first plate being rotatable with said moving part.

9. The apparatus of claim 8 wherein said switch means is mounted upon said movable part, thereby rotating with said first plate.

References Cited in the file of this patent

UNITED STATES PATENTS

| | | |
|---|---|---|
| 2,040,375 | Guthrie | May 12, 1936 |
| 2,340,213 | Ellsworth | Jan. 25, 1944 |
| 2,386,942 | Edelman | Oct. 16, 1945 |
| 2,439,092 | Lindstrom | Apr. 6, 1948 |
| 2,629,086 | Ainsworth et al. | Feb. 17, 1953 |
| 2,774,959 | Edelman et al. | Dec. 18, 1956 |
| 2,894,246 | De Graffenreid | July 7, 1959 |
| 2,925,950 | Boltinghouse et al. | Feb. 16, 1960 |

FOREIGN PATENTS

| | | |
|---|---|---|
| 346,427 | Great Britain | Apr. 7, 1931 |